(12) United States Patent
Takahashi et al.

(10) Patent No.: US 7,355,640 B2
(45) Date of Patent: Apr. 8, 2008

(54) IMAGE CAPTURING DEVICE (75) Inventors: Tatsuya Takahashi, Ogaki (JP); Tohru Watanabe, Ogaki (JP); Osamu Tabata, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 809 days.

(21) Appl. No.: 10/648,772

(22) Filed: Aug. 25, 2003

(65) Prior Publication Data
US 2004/0105009 A1 Jun. 3, 2004

(30) Foreign Application Priority Data
Aug. 26, 2002 (JP) .............................. 2002-245305

(51) Int. Cl.
*H04N 9/64* (2006.01)
(52) U.S. Cl. ...................... 348/257; 348/243; 348/312
(58) Field of Classification Search ............ 348/222.1, 348/249, 250, 251, 257, 282, 294, 311, 312, 348/241, 243
See application file for complete search history.

(56) References Cited
U.S. PATENT DOCUMENTS
6,163,342 A * 12/2000 Suzuki ........................ 348/364

| 6,480,228 B1 * | 11/2002 | Yoshihara et al. .......... 348/312 |
| 6,509,928 B1 * | 1/2003 | Ogawa et al. ............... 348/312 |
| 6,580,465 B1 * | 6/2003 | Sato ........................... 348/689 |
| 6,700,609 B1 * | 3/2004 | Abe ........................... 348/243 |
| 6,783,073 B2 * | 8/2004 | Yahagi et al. .......... 235/462.28 |
| 7,061,531 B2 * | 6/2006 | Funakoshi et al. .......... 348/243 |

* cited by examiner

*Primary Examiner*—David Ometz
*Assistant Examiner*—Pritham D. Prabhakher
(74) *Attorney, Agent, or Firm*—Hogan & Hartson LLP (57) ABSTRACT

An image capturing device having a function of clamping an image signal. When the image capturing device is activated, a synchronous signal generating section begins creation of a horizontal synchronous signal, and a counter begins counting a pulse of the horizontal synchronous signal. When the counted value reaches a predetermined value, the clamping capability control section changes the level of a clamp mode signal to an H level. During a period from the start of power supply to the image capturing device to the raising of the level of a clamp mode signal to an H level, a clamp pulse generating section sets a longer width for a clamp pulse than in a normal operation so that a switch element of a clamping circuit remains in an on state in a longer period, whereby a smaller time constant for clamping is set. After elapse of a predetermined period, the switch element is controlled so as to remain in an ON state in a normal period, which is relatively short, whereby a larger time constant for clamping is set. With this arrangement, noise which would be caused with a small clamping time constant is suppressed.

14 Claims, 12 Drawing Sheets

IMAGE CAPTURING DEVICE

BACKGROUND OF THE INVENTION

1. Field of the Invention

The present invention relates to an image capturing device for generating an image signal to output using an image capturing element and, in particular, to clamping of an image signal.

2. Description of the Related Art

An image signal captured by an image capturing element such as a CCD (charge coupled device) image sensor or the like is generally coupled by a capacitor for extraction. Therefore, the DC level of an image signal can fluctuate depending on the level of an image. In order to address this problem, an image signal corresponding to an optical black (OPB) region which is provided at the periphery of the pixel alignment of image capturing elements is clamped at a predetermined black level. In clamping, a signal terminal which outputs an image signal coupled by the capacitor is connected to a reference power source during an OPB image signal period.

An OPB region is provided surrounding the effective image capturing region, as described above. That is, a small number of top and bottom pixel lines of a plurality of horizontal lines which constitute the image alignment of image capturing elements, and a small number of pixels respectively at the leading and trailing ends of the horizontal lines constitute an OPB region. Clamping is applied during an OPB image signal period for each horizontal line, therefore periodically, and the periodical clamping for every horizontal line can suppress fluctuation of the DC level of an image signal which would otherwise be caused during a vertical scanning period.

Figure 11:
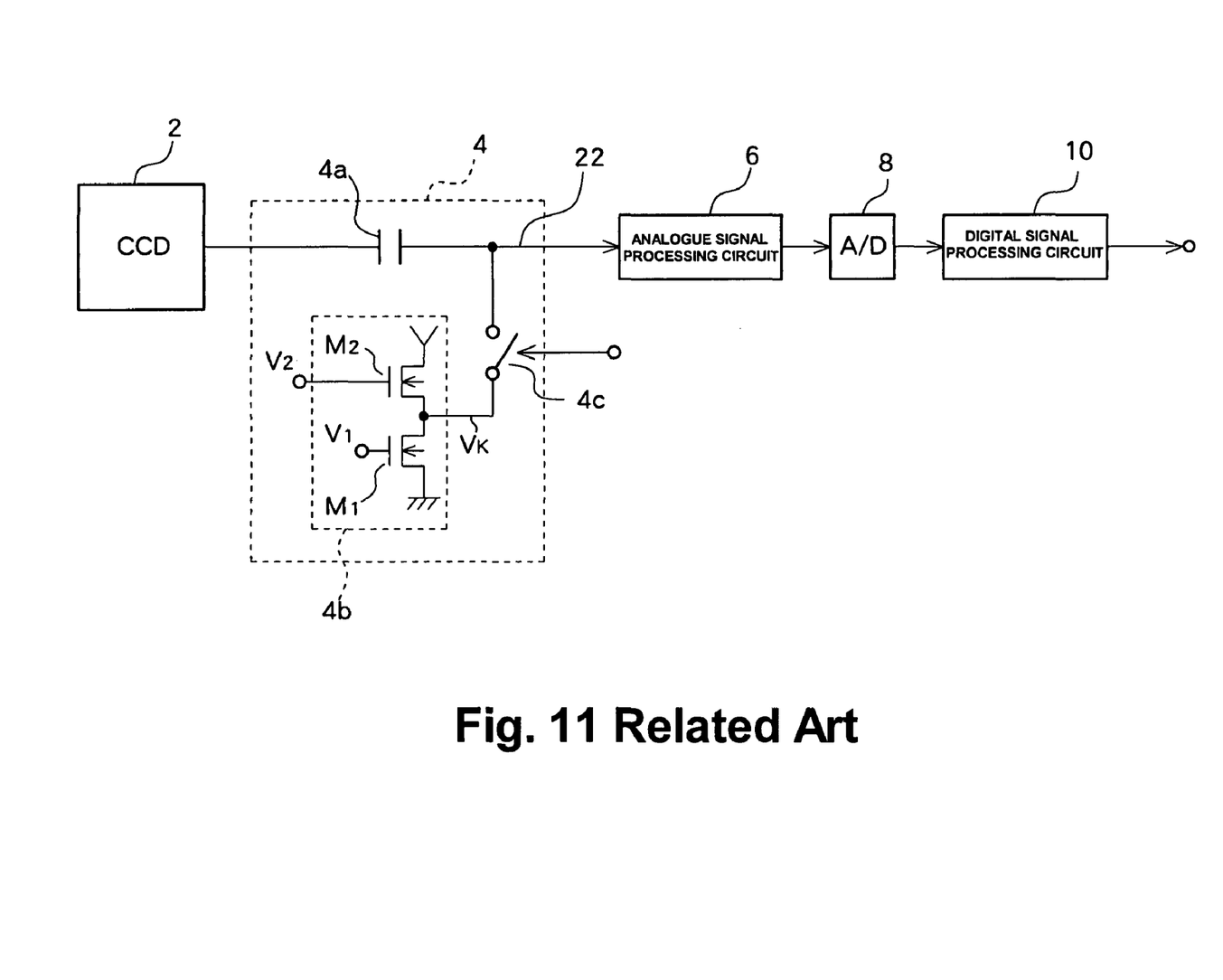
FIG. 11 is a diagram showing a structure of a conventional image capturing device.

FIG. 11 schematically shows a circuit structure of a conventional image capturing device, which comprises a CCD image sensor 2, a clamping circuit 4, an analogue signal processing circuit 6, an A/D (analogue/digital) converter 8, and a digital signal processing circuit 10. An image signal generated by the CCD image sensor 2 is coupled by a capacitor 4a in the clamping circuit 4 to be extracted to a signal line 22. The extracted image signal is subjected to predetermined signal processing in the analogue signal processing circuit 6, the A/D converter 8, and the digital signal processing circuit 10 before being output to, for example, a display device, or the like.

The clamping circuit 4 is a circuit for clamping the potential of the signal line 22, and comprises a buffer circuit 4b, which serves as a reference voltage source, and a switch element 4c for connecting the buffer circuit 4b and the signal line 22. The buffer circuit 4b comprises, for example, two transistors M1, M2 serially connected between the power source terminal and the ground terminal and outputs a voltage between the two transistors M1 and M2 as a reference voltage. The transistor M1 receives via its gate a first control voltage V1, according to which a current flowing in the buffer circuit 4b is determined. The transistor M2 receives via its gate a second control voltage V2, according to which an output voltage of the buffer circuit 4b is determined. The opening and closing of the switch element 4c is controlled in response to a clamp pulse CP, which is generated by a timing control circuit, not shown.

Figure 12:
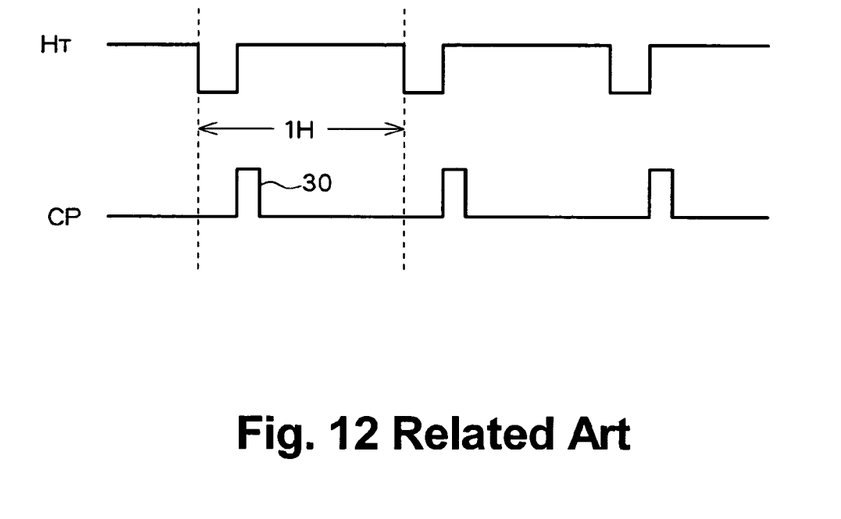
FIG. 12 is a timing chart for a conventional clamping circuit.

FIG. 12 is a timing chart explaining operation of a conventional clamping circuit. Specifically, a clamp pulse 30 is caused in synchronism with a horizontal synchronous signal HT. Each clamp pulse 30 has a predetermined width, during a period corresponding to which the switch element 4c remains in an ON state so that an output voltage $V_K$ of the buffer circuit 4b is applied to the signal line 22. A clamp pulse 30 is caused within an OPB image signal period at the beginning of each horizontal line, so that an OPB image signal is clamped at a predetermined potential whereby a black level is fixed at a constant level.

In clamping, a current is supplied from the buffer circuit 4b to the signal line 22, so that the potential of the signal line 22 is made closer to an output voltage $V_K$ of the buffer circuit 4b. The size of the potential change in the signal line 22 caused in a single application of clamping is here referred to as the "clamping capability. Clamping capability depends on current supply capacity of the buffer circuit 4b and a period of time in which the switch element 4c remains in an ON state. That is, the larger the current supply capacity of the buffer circuit 4b or the longer the electric conductive time, the larger the ensured clamping capability.

Here, the more the clamping capability is enhanced, the more a DC level to be set becomes likely to follow noise in an OPB image signal period. Consequently, a DC level of an image signal fluctuates for every horizontal line, causing combing noise in a reproduced image.

In order to address this problem, clamping capability is set at such a relatively low level, rather than the maximum level, that a relatively large number of lines are clamped at a predetermined level so that noise influence can be leveled and combing noise can be suppressed. For example, conventionally, clamping capability is set at such a time constant that achieves potential conversion which converts, while taking the whole file period, the potential at an output terminal into a potential at a predetermined level.

While image capturing does not take place, an image capturing element is not driven so that power consumption in the image capturing element, the driving circuit, and the signal processing circuit can be suppressed. During such a period, no OPB image signal is obtained and clamping is not applied, and, therefore, the potential at the output terminal is caused to change due to discharge from the capacitor while the image capturing element is not driven.

As described above, conventionally, a suppressed clamping capability, rather than the maximum clamping capability, is employed to prevent combing noise. Therefore, there exists a problem that a longer period of time is required, at the time of start of driving of an image capturing element, before the potential at the output terminal becomes stabilized with the image capturing element operating in a stable state. In turn, a longer period of time is required before an image settles in a stable state.

This process necessary to increase a clamping level to a predetermined potential level is one of the factors which hinders time reduction in activation of an image capturing device.

SUMMARY OF THE INVENTION

The present invention provides an image capturing device capable of prompt clamping of the potential at an output terminal at a predetermined level at the time driving of an image capturing element is begun, so that a normal image can be promptly obtained.

An image capturing device of the present invention comprises a solid image capturing element; a driving circuit for driving the solid image capturing element to obtain an image signal; a clamping circuit for clamping a reference level of the image signal generated by the solid image capturing element at a predetermined level; and a control circuit for controlling clamping capability of the clamping circuit. The clamping circuit gradually clamps the reference level of an image signal at a predetermined potential level.

In the present invention, clamping capability, which indicates an amount of a potential change caused by a single application of clamping, is set at a relatively low level during a period in which the solid image capturing element operates in a stable stage after a transitional period following the activation. Specifically, the clamping capability at that time may be set, for example, at such a level that enables reduction of combing noise to below an acceptable level.

Meanwhile, during a predetermined activation period after start of driving the solid image capturing element, the clamping capability is set at a different level from the above, in particular, to a higher level. Because the clamping capability is at a higher level, an image can promptly settle in a stable state with a stable DC level. The higher level of the clamping capability which is set during the predetermined activation period after the start of driving may be constant or change throughout the period.

In the present invention, the clamping circuit may further comprise a buffer circuit for outputting a predetermined reference voltage; and a switch connected between the buffer circuit and a signal line connected to an output terminal of the sold image capturing element, for switching between in an on state and in an off state. The control circuit controls clamping capability by changing a period of time in which the switch remains in an ON state.

In the present invention, the clamping circuit may also comprise a plurality of buffer circuits for each outputting a predetermined reference voltage; and a selector for selecting at least one of the plurality of buffer circuits; a switch connected between the buffer circuit selected by the selector and a signal line connected to an output terminal of the sold image capturing element, for switching between in an on state and in an off state. The control circuit controls clamping capability by changing selection by the selector.

Still further in the present invention, a clamping capability attained in a predetermined period of time after activation of image capturing may be controlled according to a preceding period of time in which image capturing by the solid image capturing element remains suspended, or an inoperative period. In general, the longer the inoperative period, the larger a potential difference in a signal line between when the solid image capturing element is operating and when it is not is caused. Therefore, a higher level of clamping capability is set for a longer inoperative period, so that an image with a stable DC level can be promptly obtained.

The present invention will be clearly understood from the description on the embodiments below. It should, however, be noted that the embodiments described below are only for illustration, and do not limit the scope of the present invention.

DESCRIPTION OF THE PREFERRED EMBODIMENTS

In the following, embodiments of the present invention will be described with reference to the accompanied drawings.

Figure 1:
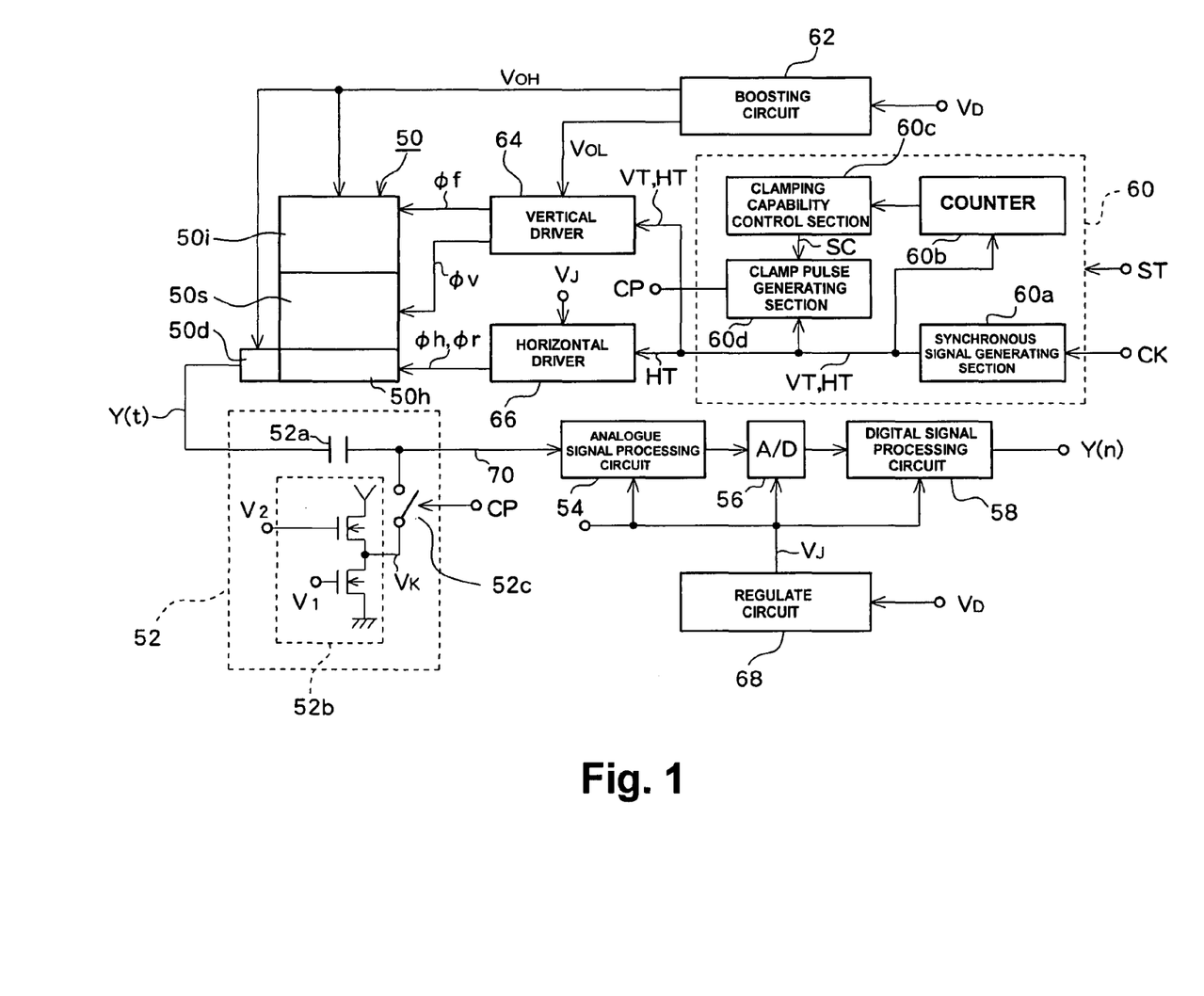
FIG. 1 is a diagram showing a circuit structure of an image capturing device.

FIG. 1 is a diagram schematically showing a circuit structure of an embodiment of the present invention. This device comprises a CCD image sensor 50, a clamping circuit 52, an analogue signal processing circuit 54, an A/D converter circuit 56, a digital signal processing circuit 58, a timing control circuit 60, a boosting circuit 62, a vertical driver 64, a horizontal driver 66, and a regulate circuit 68.

This device is activated for image capturing either by supplying of power or awaking the device from a stand-by mode, being a mode in which the power source circuits such as the boosting circuit 62 and the regulate circuit 68 remain powered but inoperative. Because in a stand-by mode, no operating voltage is supplied to CCD driver circuits, including the vertical driver 64 and the horizontal driver 66, power consumption can be suppressed.

A power voltage VD is supplied to the boosting circuit 62, which in turn boosts the supplied power voltage VD to generate a positively boosted voltage VOH and a negatively boosted voltage VOL. The generated, boosted voltages VOH and VOL are supplied to the CCD image sensor 50 and the vertical driver 64, respectively. A power voltage VD is also supplied to the regulate circuit 68, which in turn depresses the supplied power voltage VD to generate a predetermined regulating voltage VJ [Maybe "regulating voltage VJ" or "regulated voltage VJ"? Globally replace, if necessary.] to output. The output regulating voltage VJ is utilized in the analogue signal processing circuit 54, the A/D converter circuit 56, the digital signal processing circuit 58, and the horizontal driver 66.

The CCD image sensor 50 may be, for example, a frame-transfer type and may comprise an image capturing section 50$i$, a storing section 50$s$, a horizontal transfer section 50$h$, and an output section 50$d$. In such a sensor, the image capturing section 50$i$ comprises a plurality of light receiving pixels in a matrix arrangement and, in response to an incident light, stores information charges in each of the light receiving pixels. The storing section 50s obtains information charges for one image screen from the image capturing section 50i and stores the charges therein for a predetermined period. The horizontal transfer section 50h obtains information charges in the units of lines from the storing section 50s and horizontally transfers the charges in the units of one pixel. The output section 50d converts the information charges supplied from the horizontal transfer section 50h into an image signal to output.

The vertical driver 64 generates a frame transfer clock φf and a vertical transfer clock φV both of which have a pulse height in accordance with the supplied, boosted voltage VOL. Specifically, a frame transfer clock φf is generated in synchronism with a vertical synchronous signal VT, while a vertical transfer clock φV is generated in synchronous with a vertical synchronous signal VT and a horizontal synchronous signal HT. These clocks φf, φV are supplied to the CCD image sensor 50.

In the CCD image sensor 50, frames are transferred in response to a frame transfer clock φf, whereby information charges stored in the image capturing section 50i are collectively transferred to the storing section 50s at a high speed every one screen image. Further, vertical transfer is performed in response to a vertical transfer clock φV whereby information charges stored in the storing section 50s are vertically transferred in the units of one horizontal line for every period of a horizontal synchronous signal HT to the horizontal transfer section 50h. Through the above operation, information charges stored in the storing section 50s are read out for every line and supplied to the horizontal transfer section 50h.

A regulating voltage VJ is also supplied to the horizontal driver 66, which in turn begins generation of a horizontal transfer clock φh and a reset clock φr in synchronous with a horizontal synchronous signal HT. A horizontal transfer clock φh is supplied to the horizontal transfer section 50h, so that, in response to the horizontal transfer clock φh, the information charges for one line, which have been transferred from the storing section 50s and stored in the horizontal transfer section 50h, are horizontally transferred in the units of one pixel to the output section 50d. Through the above operation, information charges for one pixel are sequentially read out from the horizontal transfer section 50h to the output section 50d.

The output section 50d alternately conducts reading of the information charges from the horizontal transfer section 50h for storage in a floating diffusion layer and outputting of the information charges from the floating diffusion layer in response to a reset clock φr. Specifically, the potential in the floating diffusion layer changes according to the amount of charges stored therein, so that a voltage signal according to the changed potential is output as an image signal Y (t) from the CCD image sensor 50.

While an image is being captured, an image signal Y(t) generated by the CCD image sensor 50 is coupled by the capacitor 52a in the clamping circuit 52 to be extracted to the signal line 70. The extracted image signal is then given predetermined signal processing in the analogue signal processing circuit 54, the A/D converter circuit 56, and the digital signal processing circuit 58 before being output to, for example, a display device of the like.

The clamping circuit 52, or a circuit for clamping potential of the signal line 70, comprises a buffer circuit 52b, which serves as a reference voltage source, and a switch element 52c for connecting the buffer circuit 52b and the signal line 70. The switch element 52c is controlled for its turning on/off according to a clamp pulse CP, generated by the timing control circuit 60.

The timing control circuit 60 comprises a plurality of counters, each for counting a reference clock CK and, in response to a reference clock CK, generates various control signals directed to the clamping circuit 52, the vertical driver 64, the horizontal driver 66, the regulate circuit 68, and other circuits, as well as an internal clock CK', which serves as an internal system clock for the image capturing device. Through these clocks, respective circuits are controlled so as to operate synchronously with the CCD image sensor 50.

The timing control circuit 60 responsive to an externally supplied stand-by mode signal ST suspends operations of the boosting circuit 62 and the regulate circuit 68, whereby output of the boosted voltages VOH and VOL and a regulating voltage VJ respectively from the boosting circuit 62 and the vertical driver 64 are suspended.

The timing control circuit 60 comprises a synchronous signal generating section 60a, a counter 60b, a clamping capability control section 60c, and a clamp pulse generating section 60d. The synchronous signal generating section 60a divides a reference clock CL by a predetermined dividing ratio to thereby generate a vertical synchronous signal VT and a horizontal synchronous signal HT.

A vertical synchronous signal VT and a horizontal synchronous signal HT are used in the counter 60b. Specifically, the counter 60b is reset upon the powering of the image capturing device or the device's return from a stand-by mode, and begins counting a pulse of the synchronous signals VT and HT.

Based on the counted value by the counter 60b, the clamping capability control section 60c generates a clamp mode signal SC. Specifically, the clamping capability control section 60c changes the level of a clamp mode signal SC from an L (low) level to an H (high) level, when the counted value of the counter 60b reaches a predetermined threshold.

After the start of power supply to the image capturing device or after the device's awakening from a stand-by mode, the clamp pulse generating section 60d begins generation of a clamp pulse CP in synchronism with a horizontal synchronous signal HT. In this generation, the clamp pulse generating section 60d sets a longer width for a clamp pulse CP while a clamp mode signal SC remains at an L level, and sets a normal width when the level of the clamp mode signal SC is thereafter raised to an H level. Consequently, the switch element 52c remains in an ON state for a longer period than in a normal operation during a predetermined period before the level of the clamp mode signal SC is raised to an H level, so that the clamping capability of the clamping circuit 52 is enhanced. Therefore, the potential at the signal line 70 can promptly change closer to an output voltage $V_K$ of the buffer circuit 52b in activation of image capturing.

Figures 2A, 2B:
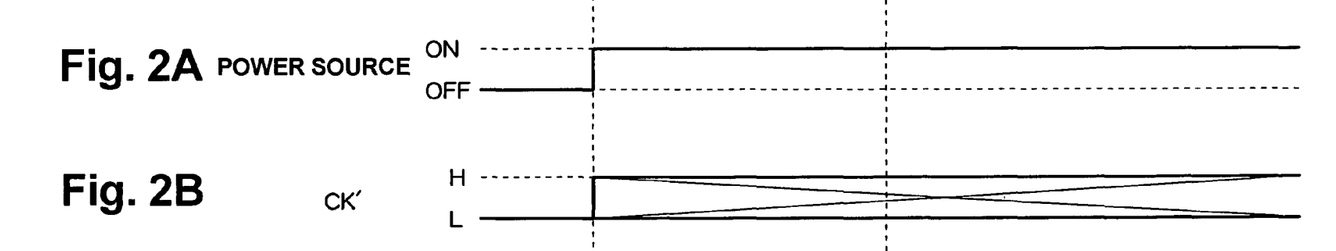
FIG. 2A is a timing chart concerning a power source.
FIG. 2B is a timing chart concerning an internal system clock.
Figure 2C:
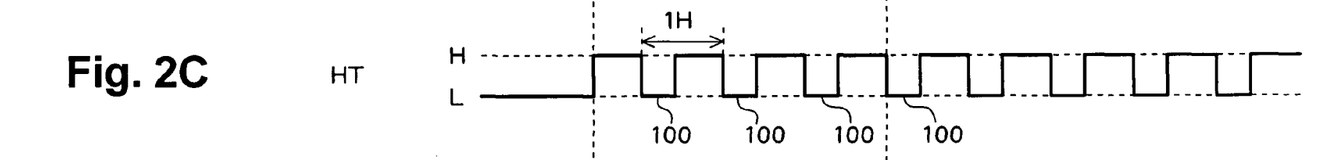
FIG. 2C is a timing chart concerning a horizontal synchronous signal.
Figure 2D:
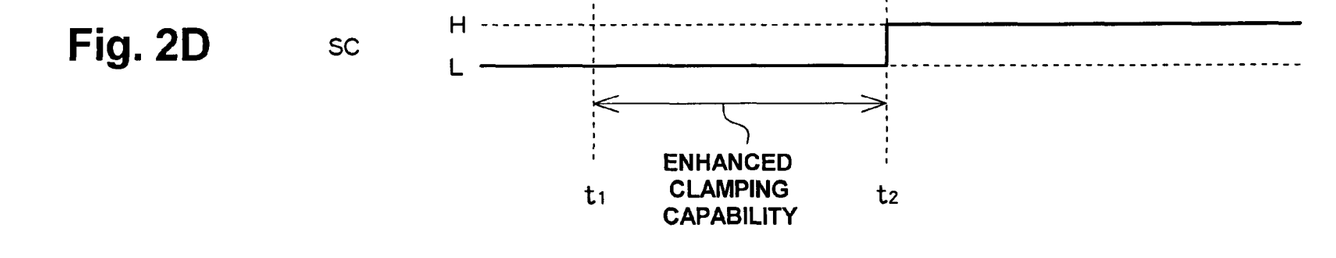
FIG. 2D is a timing chart concerning a clamp mode signal.

FIGS. 2A to 2D are timing charts explaining clamping control to be applied at the time of start of power supply to the device of the present invention. FIG. 2A shows a power source in an ON/OFF state; FIG. 2B shows an internal system clock CK'; FIG. 2C shows a horizontal synchronous signal HT; and FIG. 2D shows a clamp mode signal SC.

At time t1, when the power source is turned on, oscillation of a clock CK' synchronously begin, as well as creation of a horizontal synchronous signal HT. The counter 60b is reset to 0 at time t1, as described above, and begins counting a pulse 100 of a horizontal synchronous signal HT, which is caused for every horizontal scanning period (1H).

The clamping capability control section 60c controls such that a clamp mode signal SC remains at an L level while the counted value is equal to or smaller than a predetermined threshold, that is, "3" here, and is changed to be at an H level at a time t2, at which the counted value exceeds the threshold, becoming "4" here. That is, the clamp pulse generating section 60d controls such that clamping capability of the clamping circuit 52 remains enhanced during a period between time t1 and time t2, in which the clamp mode signal SC remains at an L level, and that the clamping capability is reduced to remain at such a level that enables reduction of combing noise to below an acceptable level during a period after time t2.

Figure 3A:
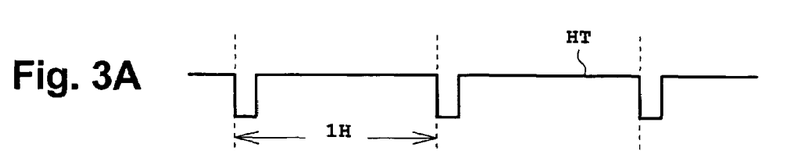
FIG. 3A is a timing chart for a horizontal synchronous signal.
Figure 3B:
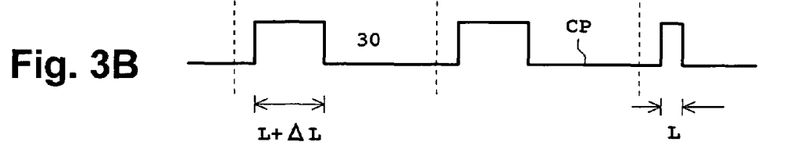
FIG. 3B is a timing chart for a clamp pulse.
Figure 3C:
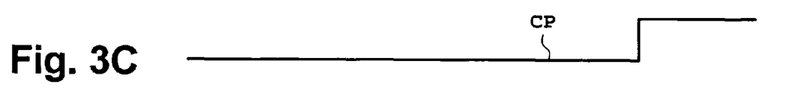
FIG. 3C is a timing chart for a clamp mode signal.

FIGS. 3A to 3C are timing charts respectively explaining a horizontal synchronous signal HT, a clamp pulse CP, and a clamp mode signal SC. Specifically, a clamp pulse CP 30 synchronous with a horizontal synchronous signal HT is generated. In particular, while the clamping capability control section 60c controls such that a clamp mode signal SC remains at an L level, the clamp pulse generating section 60d causes a clamp pulse 30 having a pulse width (L+ΔL), that is, larger than a default width L by an additional amount ΔL, and while the clamping capability control section 60c controls such that a clamp mode signal SC remains at an H level, the clamp pulse generating section 60d causes a clamp pulse 30 having a normal width L.

As described above, a clamp pulse CP is used in on/off control of the switch element 52c. That is, the switch element 52c remains in an ON state during a period corresponding to the pulse width of a clamp pulse CP. Therefore, while a clamp mode signal SC remains at an L level, the switch element 52c resultantly remains in an ON state for a period corresponding to a pulse width (L+ΔL), during which the clamping circuit 52 continues clamping the potential of the signal line 70. Meanwhile, while a clamp mode signal SC remains at an H level, the switch element 52c resultantly remains in an ON state for a period corresponding to a pulse width L, during which the clamping circuit 52 continues clamping the potential of the signal line 70.

That is, during a predetermined period after start of power supply to the image capturing device, the clamping circuit 52 continues operating for a period of time which is elongated by an additional amount ΔL of a pulse width. Consequently, clamping capability is enhanced. It should be noted that an additional amount ΔL may either be constant or change in the predetermined period t after start of supply of power to the image capturing device.

Figure 4:
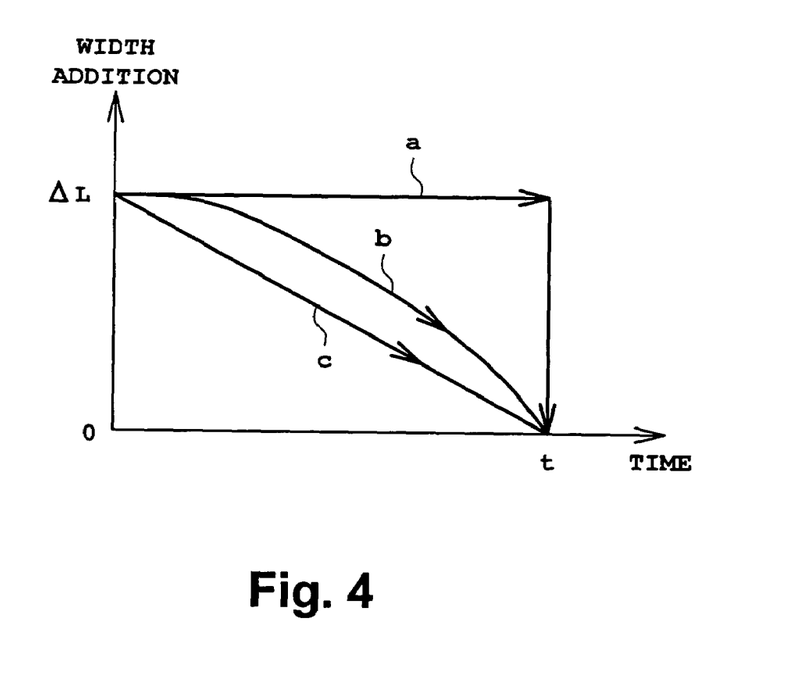
FIG. 4 is a graph showing a relationship between the time after start of power supply and the additional amount of a pulse width.

FIG. 4 shows relationship between the time elapsed after start of power supply to the image capturing device and the additional amount ΔL of a pulse width. In the drawing, line (a) relates to a case wherein a constant additional amount ΔL is maintained, line (b) relates to a case wherein the additional amount ΔL is maintained constant for a predetermined period and is thereafter gradually reduced until time t, and line (c) relates to a case wherein the additional amount ΔL is linearly reduced. The clamp pulse generating section 60d employs any of these patterns relative to an additional amount ΔL to determine a pulse width (L+ΔL) of a clamp pulse CP. Patterns (a), (b), and (c) may be selected as desired or according to specific conditions.

Here, the potential of the signal line 70, to which an image signal is extracted by means of coupling by a capacitor, changes depending on a period of time in which the CCD image sensor 50 remains inoperative after suspension and before resumption of image capturing, or an inoperative period. That is, a longer inoperative period results a larger difference in potential at the signal line 70 between when the CCD image sensor 50 is operating and when it is not due to discharge from the capacitor 52a. Therefore, the timing control circuit 60 may measure an inoperative period of time by counting an internal clock or using an internal timer and determines a suitable additional amount ΔL for a clamp pulse CP depending on the inoperative period of time.

Figure 5:
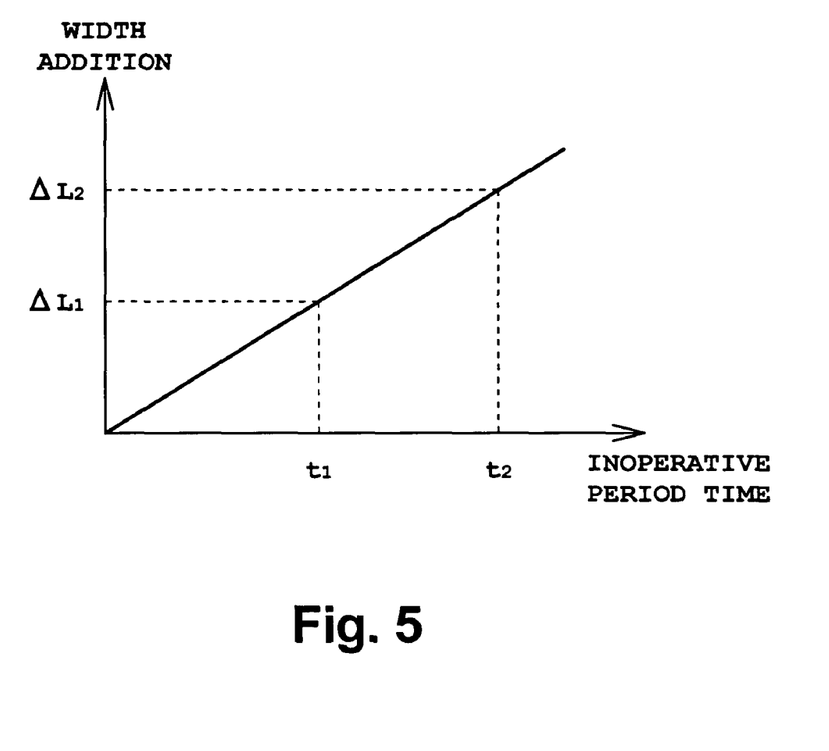
FIG. 5 is a graph showing relationship between an inoperative period and an additional amount of a pulse width.

FIG. 5 shows a relationship between an inoperative period of time and an additional amount ΔL of a pulse width, in which the additional amount ΔL increases substantially proportionally to an inoperative period of time. Specifically, for an inoperative period of time t1, an additional amount ΔL is set, so that the clamp pulse generating section 60d creates, and supplies to the switch element 52c, a clamp pulse CP having a width (L+ΔL1) while a clamp mode signal SC remains at an L level, and a clamp pulse CP having a width L while a clamp mode signal SC remains at an H level. Further, for an inoperative period of time t2, an additional pulse ΔL2 (ΔL1<ΔL2) is set, so that the clamp pulse generating section 60d creates, and supplies to the switch element 52c, a clamp pulse CP having a pulse width (L+ΔL2) while a clamp mode signal SC remains at an L level and a clamp pulse CP having a pulse width ΔL while a clamp mode signal SC remains at an H level. That is, the longer the inoperative period of time, the longer the switch element 52c remains in an ON state during a predetermined period before the CCD image sensor 50 resumes operating. Consequently, the clamping capability of the clamping circuit 52 is enhanced.

It should be noted that, although the additional amount ΔL of a pulse width retains substantially proportional relationship with respect to an inoperative period of time in FIG. 5, any other function which can increase an additional amount ΔL relative to a longer inoperative period can be employed.

After supply of power begins, an additional amount ΔL is maintained constant within a predetermined period t. Alternatively, an additional amount ΔL may be reduced over time, or reduced or increased depending on an inoperative period. An additional amount ΔL may be determined through any desirable combination of these conditions.

Figure 6:
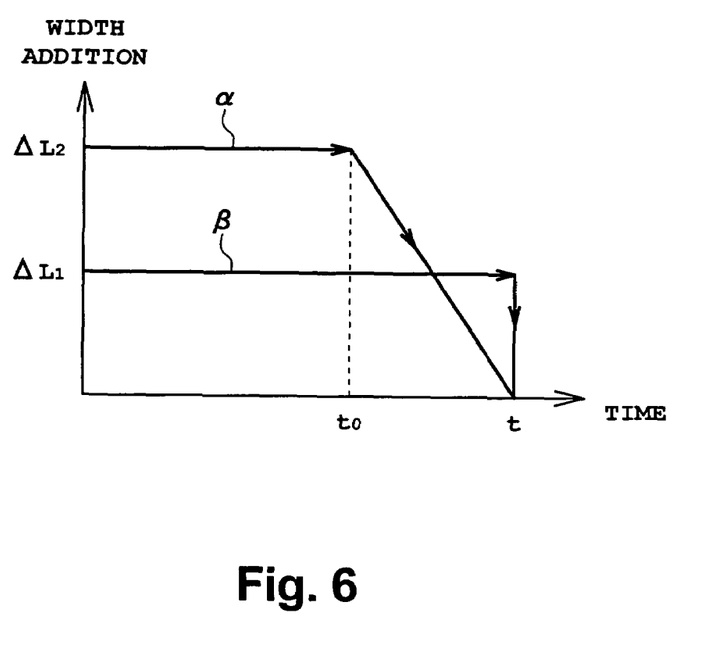
FIG. 6 is a graph showing a relationship between the time after start of power supply and the additional amount of a pulse width, using an inoperative period as a parameter.

FIG. 6 shows variation of the additional amount ΔL over time subsequent to the start of power supply. As shown, an additional amount ΔL is set at an finite value during a period from time 0 to time t. When a preceding inoperative period is longer than a predetermined threshold period, the additional amount ΔL is maintained at a constant value ΔL2 until a predetermined period to has elapsed, and is thereafter gradually reduced after time t0 to time t (α). Meanwhile, when a preceding inoperative period is not longer than a predetermined threshold period of time, an additional amount ΔL is kept at a constant value ΔL1 (β). Note that the relationship ΔL1<ΔL2 is maintained in the above.

According to the pattern α, in which an additional amount ΔL is varied during a period from time 0 to time t, and additionally according to an inoperative period of time, significantly enhanced clamping capability can be obtained during a period from time 0 to time t, so that the potential of the signal line 70 can promptly change closer to Vk.

Figure 7A:
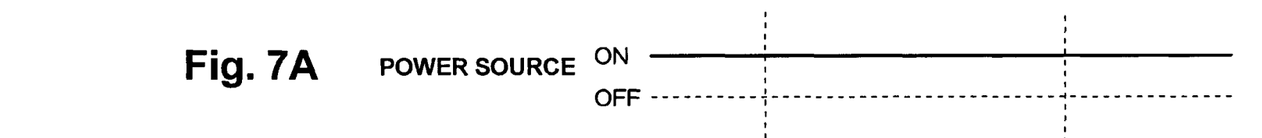
FIG. 7A is a timing chart concerning a power source.
Figure 7B:
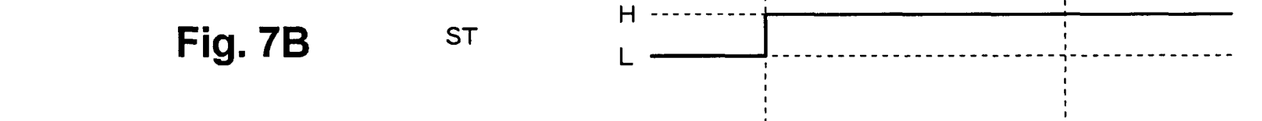
FIG. 7B is a timing chart concerning a stand-by signal.
Figure 7C:
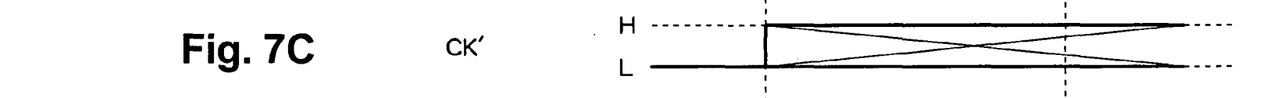
FIG. 7C is a timing chart concerning an internal system clock.
Figure 7D:
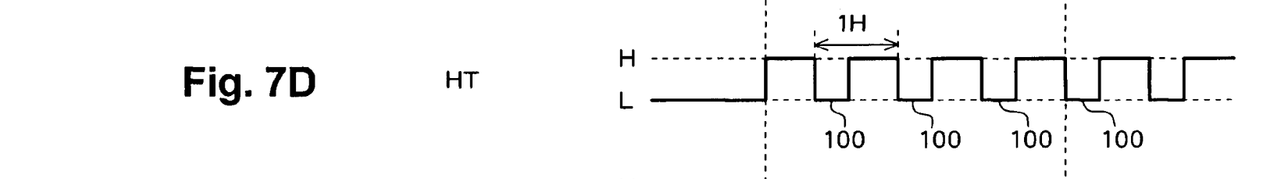
FIG. 7D is a timing chart concerning a horizontal synchronous signal.
Figure 7E:
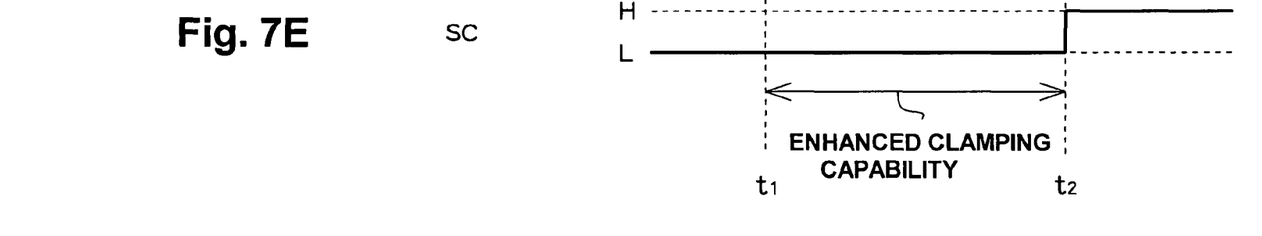
FIG. 7E is a timing chart concerning a clamp mode signal.

FIGS. 7A to 7E are timing charts explaining clamping control to be applied when the device of the present invention returns from a stand-by mode. FIG. 7A relates to a power source in an ON/OFF state, FIG. 7B relates to a stand-by mode signal ST, FIG. 7C relates to an internal system clock CK', FIG. 7D relates to a horizontal synchronous signal HT, and FIG. 7E relates to a clamp mode signal SC.

Specifically, at time t1, a stand-by mode signal ST switches from an L level to an H level to thereby instruct the device to awaken from a stand-by mode. In synchronism with the switching, oscillation of the clock CK' begins, as does creation of a horizontal synchronous signal HT. Similar to the time of starting of the power supply, as described with reference to FIG. 2, the clamping capability control section 60c controls such that a clamp mode signal SC remains at an L level while the counted value is equal to or smaller than a predetermined threshold, which is "3" here, and i set to an H level at a time t2, at which the counted value exceeds the threshold, becoming "4" here. That is, the clamp pulse generating section 60d controls such that clamping capability of the clamping circuit 52 remains enhanced during a period between time t1 and time t2, in which the clamp mode signal SC remains at an L level, and that the clamping capability is reduced to remain at a level that enables reduction of combing noise to below an acceptable level during a period after time t2.

While in the above structure clamping capability of the clamping circuit 52 is controlled according to the width of a clamp pulse CP, which corresponds to a period in which the switch element 52c remains in an ON state, the clamping capability can also be controlled by increasing or decreasing an amount of current to be supplied from the clamping circuit 52 to the signal line 70 while the switch element 52c remains in an ON state.

Figure 8:
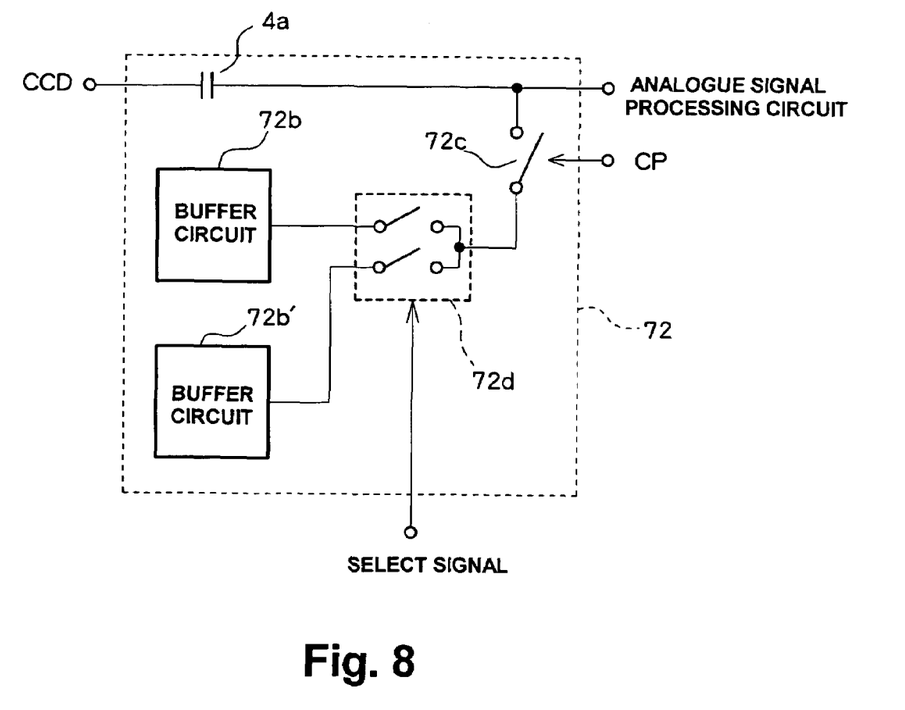
FIG. 8 is a diagram showing another structure of a clamping circuit.

FIG. 8 schematically shows another structure of a clamping circuit. Specifically, a clamping circuit 72 for clamping an output from a CCD image sensor 50 comprises a switch element 72c, two buffer circuits 72b, 72b arranged in parallel, and a selector 72d for selecting an output from either the buffer circuit 72b or 72b' to supply to the switch element 72c.

With this structure, when the buffer circuit 72b is supplied with a larger amount of current than that supplied to the buffer circuit 72b', the selector 72d selects an output from the buffer circuit 72b during a period from time t1 to t2, and an output from the buffer circuit 72b' in a subsequent normal operation. In the above, a signal SC can be used as a select signal for controlling switching of the selection by the selector 72d. In this case, specifically, the buffer circuit 72b selects the buffer circuit 72b while it is supplied with a control signal at an L level, and the buffer circuit 72b' while it is supplied with a control signal at an H Level.

It should be noted that, with the structure of FIG. 8, in order to enhance clamping capability during a period from time t1 to time t2 as compared to during a normal operation, the selector 72d can select, or make effective, both outputs from the buffer circuit 72b and 72b'. That is, different levels of clamping capabilities can be set through desirable combination of buffer circuits to be selected, or made effective. Note that the power supply capabilities of the two buffer circuits 72b and 72b' may be either equal or different.

Figure 9:
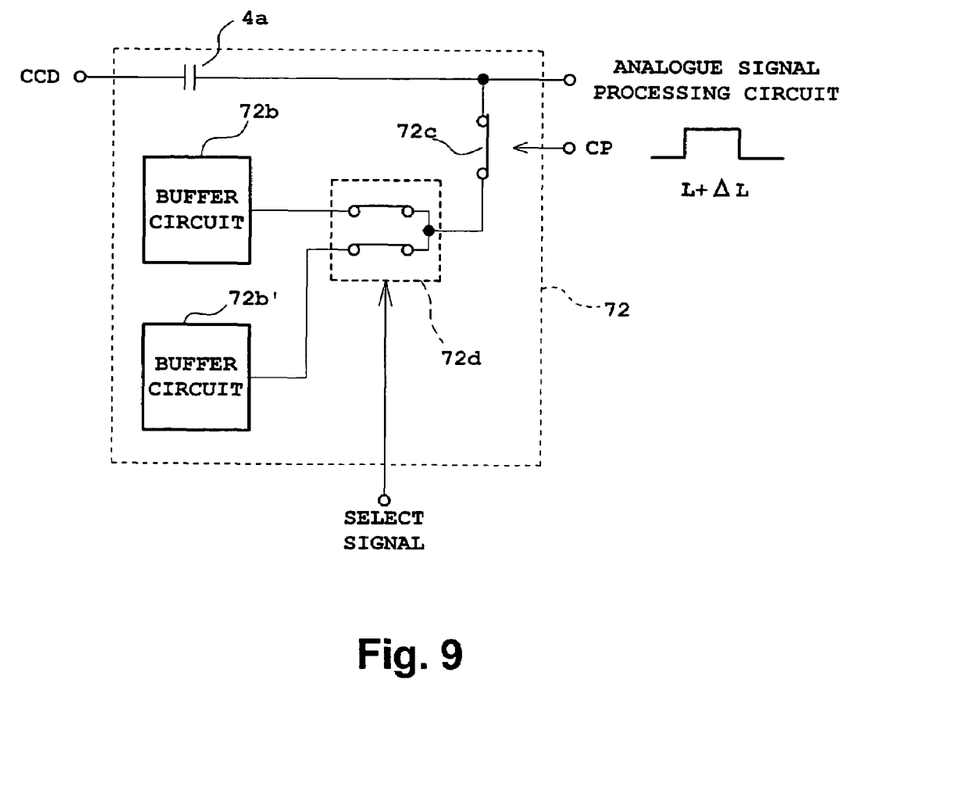
FIG. 9 is a diagram explaining operation of the clamping circuit of FIG. 8.
Figure 10:
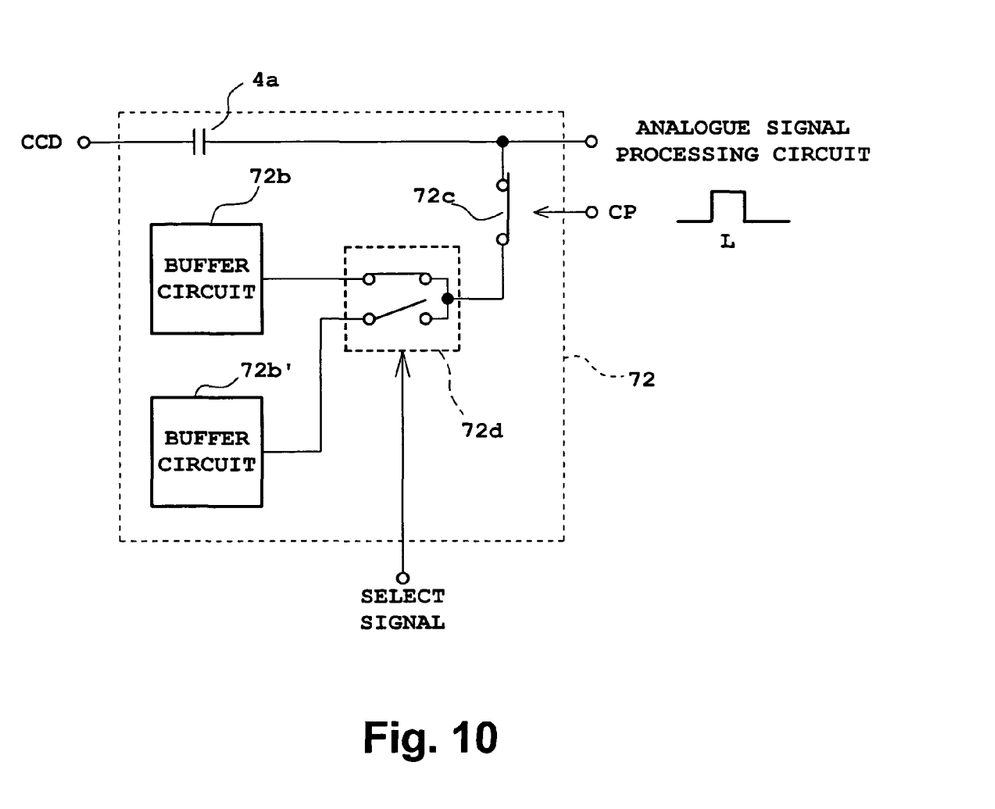
FIG. 10 is a diagram explaining operation of the clamping circuit of FIG. 8.

FIGS. 9 and 10 show additional examples of operation using two buffer circuits 72b, 72b'. Here, in order to increase or decrease clamping capability of the image capturing circuit, the timing control circuit 60 increases or decreases the width of a clamp pulse CP to be supplied to the switch element 52c of the clamping circuit 52, as shown in FIG. 1. Alternatively, the timing control circuit 60 supplies a clamp mode signal SC to the selector 72d to therewith control selection by the selector 72d such that the selector 72 selects either or both of outputs from the buffer circuit 72b and 72b', as shown in FIG. 8. Therefore, it will be appreciated that controlling both of the switch element 52c and the selectors 72b and 72b' by the timing control circuit 60 enables highly accurate adjustment of clamping capability.

Specifically, when the maximum clamping capability is required, for example, during a predetermined period after start of power supply following a longer-than predetermined inoperative period, the selector 72d may be controlled so as to select, or make effective, both outputs from the buffer circuit 72b, 72b' and, additionally, a clamp pulse CP having a pulse width (L+ΔL) is supplied to the switch element 72c, as shown in FIG. 9.

Meanwhile, when enhanced, but not necessarily maximum, clamping capability is required, the selector 72d may be controlled so as to select, or make effective, an output from only one of the buffer circuit 72b or 72b', which can increase clamping capability, and a clamp pulse CP having a pulse width L (or L+ΔL) is supplied to the switch element 72c, as shown in FIG. 10. The structure of FIG. 10 can attain higher clamping capability than that in a normal operation, though lower than the clamping capability attained using the structure of FIG. 9.

When the buffer circuits 72b, 72b' can attain clamping capabilities of equal levels, controlling the switch element 72c and the selector 72d can achieve clamping capabilities of various levels as described below.

Mode (1)
pulse width: L+ΔL
selector: buffer circuit 72b and 72b' both effective
clamping capability: very high Mode (2)
pulse width: L+ΔL
selector: buffer circuit 72b effective
clamping capability: high Mode (3)
pulse width: L
selector: buffer circuit 72b and 72b' both effective
clamping capability: high Mode (4)
pulse width: L
selector: buffer circuit 72b effective
clamping capability: low (normal operation)

The timing control circuit 60 may apply control according to Mode (1) when an inoperative period is longer than a threshold period of time, and Mode (2) or (3) when an inoperative period is shorter than a threshold period of time. Further, the timing control circuit 60 may control the width of a clamp pulse CP and switching of an effective buffer circuit or circuits based on a map which is defined as a function of a clamp mode signal SC and an inoperative period.

In the above description of embodiments of the present invention, a CCD image sensor 50 of a film transfer type is referred to. However, application of the present invention is not limited to such sensors, and the present invention can be applied also to an image capturing device employing a CCD image sensor of an interline type or a frame interline type.

What is claimed is:

1. An image capturing device, comprising:
a solid image capturing element;
a driving circuit for driving the solid image capturing element to obtain an image signal;
a clamping circuit for clamping a reference level of the image signal generated by the solid image capturing element at a predetermined level; and
a control circuit for controlling clamping capability of the clamping circuit;
wherein the control circuit controls such that a clamping capability attained within a predetermined period after start of image capturing by the solid image capturing element becomes different from a clamping capability attained in another period;
wherein the clamping circuit comprises two or more clamping circuit sections, and
the control circuit controls such that a larger number of clamping circuit sections operate within a predetermined period after start of image capturing by the solid image capturing element than in another period.

2. The device according to claim 1, wherein
the clamping circuit comprises two or more clamping circuit sections which respectively have clamping capabilities at different levels, and
the control circuit controls such that a clamping circuit section at a higher level operates within a predetermined period after start of image capturing by the solid image capturing element while a clamping circuit section at a lower level operates in another period.

3. An image capturing device, comprising:
a solid image capturing element;
a driving circuit for driving the solid image capturing element to obtain an image signal;
a clamping circuit for clamping a reference level of the image signal generated by the solid image capturing element at a predetermined level; and
a control circuit for controlling clamping capability of the clamping circuit;
wherein the control circuit controls such that a clamping capability attained within a predetermined period after start of image capturing by the solid image capturing element becomes different from a clamping capability attained in another period;
wherein the control circuit controls such that the clamping capability within a predetermined period after start of image capturing by the solid image capturing element becomes higher in level than the clamping capability attained in another period;
wherein the clamping circuit comprises two or more clamping circuit sections, and
wherein the control circuit controls such that a larger number of clamping circuit sections operate longer within a predetermined period after start of image capturing by the solid image capturing element than in another period.

4. An image capturing device, comprising:
a solid image capturing element;
a driving circuit for driving the solid image capturing element to obtain an image signal;
a clamping circuit for clamping a reference level of the image signal generated by the solid image capturing element at a predetermined level; and
a control circuit for controlling clamping capability of the clamping circuit;
wherein the control circuit controls such that a clamping capability attained within a predetermined period after start of image capturing by the solid image capturing element becomes different from a clamping capability attained in another period;
wherein the control circuit controls such that the clamping capability within a predetermined period after start of image capturing by the solid image capturing element becomes higher in level than the clamping capability attained in another period;
wherein the clamping circuit comprises two or more clamping circuit sections which respectively have clamping capabilities at different levels, and
wherein the control circuit controls such that a clamping circuit section at a higher level operates longer within a predetermined period after start of image capturing by the solid image capturing element than in another period.

5. An image capturing device, comprising:
a solid image capturing element;
a driving circuit for driving the solid image capturing element to obtain an image signal;
a clamping circuit for clamping a reference level of the image signal generated by the solid image capturing element at a predetermined level; and
a control circuit for controlling clamping capability of the clamping circuit;
wherein the control circuit controls such that a clamping capability attained within a predetermined period after start of image capturing by the solid image capturing element becomes different from a clamping capability attained in another period;
wherein the control circuit controls such that the clamping circuit operates longer within a predetermined period after start of image capturing by the solid image capturing element than in another period; and
wherein the control circuit controls such that a clamping circuit section operates, within a predetermined period after image capturing by the solid image capturing element is started, in a period which is longer by an amount $\Delta L$ than a period $L$ in which the clamping circuit section operates in another period.

6. An image capturing device, comprising: a solid image capturing element; a driving circuit for driving the solid image capturing element to obtain an image signal; a clamping circuit for clamping a reference level of the image signal generated by the solid image capturing element at a predetermined level; and a control circuit for controlling clamping capability of the clamping circuit; wherein the control circuit controls such that a clamping capability attained within a predetermined period after start of image capturing by the solid image capturing element becomes different from a clamping capability attained in another period; wherein the control circuit controls such that the clamping circuit operates longer within a predetermined period after start of image capturing by the solid image capturing element than in another period; wherein the control circuit controls such that a clamping circuit section operates, within a predetermined period after image capturing by the solid image capturing element is started, in a period which is longer by an amount $\Delta L$ than a period $L$ in which the clamping circuit section operates in another period; and wherein the control circuit controls such that the amount $\Delta L$ remains constant within a predetermined period after commencement of image capturing by the solid image capturing element.

7. An image capturing device, comprising: a solid image capturing element; a driving circuit for driving the solid image capturing element to obtain an image signal; a clamping circuit for clamping a reference level of the image signal generated by the solid image capturing element at a predetermined level; and a control circuit for controlling clamping capability of the clamping circuit; wherein the control circuit controls such that a clamping capability attained within a predetermined period after start of image capturing by the solid image capturing element becomes different from a clamping capability attained in another period; wherein the control circuit controls such that the clamping circuit operates longer within a predetermined period after start of image capturing by the solid image capturing element than in another period; wherein the control circuit controls such that a clamping circuit section operates, within a predetermined period after image capturing by the solid image capturing element is started, in a period which is longer by an amount $\Delta L$ than a period $L$ in which the clamping circuit section operates in another period; and wherein the control circuit controls so as to reduce the amount $\Delta L$ within a predetermined period after commencement of image capturing by the solid image capturing element.

8. An image capturing device, comprising:
a solid image capturing element;
a driving circuit for driving the solid image capturing element to obtain an image signal;
a clamping circuit for clamping a reference level of the image signal generated by the solid image capturing element at a predetermined level;
a control circuit for controlling such that a clamping capability attained within a predetermined period after start of image capturing by the solid image capturing element becomes different from a clamping capability attained in another period; and
a detection circuit for measuring an inoperative period during which the solid image capturing element suspends image capturing,
wherein
the control circuit controls such that the clamping capability within a predetermined period after start of image capturing by the solid image capturing element becomes higher in level than the clamping capability attained in another period, and controls such that the clamping capability becomes higher in level with respect to a longer inoperative period.

9. The device according to claim 8, wherein
the control circuit controls such that the clamping circuit operates longer within a predetermined period after start of image capturing by the solid image capturing element than in another period, and controls such that the clamping circuits operates longer with respect to a longer inoperative period.

10. The device according to claim 8, wherein
the clamping circuit comprises two or more clamping circuit sections, and
the control circuit controls such that a larger number of clamping circuit sections operate within a predetermined period after start of image capturing by the solid image capturing element than in another period, and controls such that a larger number of clamping circuit sections operate with respect to a longer inoperative period.

11. The device according to claim 8, wherein
the clamping circuit comprises two or more clamping circuit sections having different levels of clamping capability, and
the control circuit controls such that a clamping circuit section at a higher level operates within a predetermined period after start of image capturing by the solid image capturing element while a clamping circuit section at a lower level operates in another period, and controls such that the clamping capability becomes higher in level with respect to a longer inoperative period.

12. An image capturing device, comprising:
a solid image capturing element;
a driving circuit for driving the solid image capturing element to obtain an image signal;
a clamping circuit for clamping a reference level of the image signal generated by the solid image capturing element at a predetermined level; and
a control circuit for controlling clamping capability of the clamping circuit;
wherein the control circuit controls such that a clamping capability attained within a predetermined period after start of image capturing by the solid image capturing element becomes different from a clamping capability attained in another period;
wherein the control circuit controls such that the clamping capability within a predetermined period after start of image capturing by the solid image capturing element becomes higher in level than the clamping capability attained in another period; and further comprising:
a buffer circuit for outputting a predetermined reference voltage; and
a switch connected between the buffer circuit and a signal line connected to an output terminal of the sold image capturing element, for switching between in an on state and in an off state, and
wherein
the control circuit controls the clamping capability by changing a period in which the switch remains in an on state.

13. An image capturing device, comprising:
a solid image capturing element;
a driving circuit for driving the solid image capturing element to obtain an image signal;
a clamping circuit for clamping a reference level of the image signal generated by the solid image capturing element at a predetermined level; and
a control circuit for controlling clamping capability of the clamping circuit;
wherein the control circuit controls such that a clamping capability attained within a predetermined period after start of image capturing by the solid image capturing element becomes different from a clamping capability attained in another period; and
further comprising:
a plurality of buffer circuits for outputting a predetermined reference voltage;
a selector for selecting at least one of the plurality of buffer circuits;
a switch connected between the buffer circuit selected by the selector and a signal line connected to an output terminal of the solid image capturing element, for switching between in an on state and in an off state,
wherein
the control circuits controls the clamping capability by changing either a type or a number of the buffer circuit selected by the selector.

14. An image capturing device, comprising:
a solid image capturing element;
a driving circuit for driving the solid image capturing element to obtain an image signal;
a clamping circuit for clamping a reference level of the image signal generated by the solid image capturing element at a predetermined level; and
a control circuit for controlling clamping capability of the clamping circuit;
wherein the control circuit controls such that a clamping capability attained within a predetermined period after start of image capturing by the solid image capturing element becomes different from a clamping capability attained in another period; and
further comprising:
a plurality of buffer circuits for outputting a predetermined reference voltage;
a selector for selecting at least one of the plurality of buffer circuits;
a switch connected between the buffer circuit selected by the selector and a signal line connected to an output terminal of the solid image capturing element, for switching between in an on state and in an off state,
wherein
the control circuits controls the clamping capability by changing at least one of a period in which the switch remains in an on state, a type of the buffer circuit selected by the selector, and a number of the buffer circuit selected by the selector.

* * * * *